US010824430B1

(12) United States Patent
Fatehi et al.

(10) Patent No.: US 10,824,430 B1
(45) Date of Patent: Nov. 3, 2020

(54) RESOLVING OPERAND STORE COMPARE CONFLICTS

(71) Applicant: International Business Machines Corporation, Armonk, NY (US)

(72) Inventors: Ehsan Fatehi, Austin, TX (US); Brian W. Thompto, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 5 days.

(21) Appl. No.: 16/394,056

(22) Filed: Apr. 25, 2019

(51) Int. Cl.
*G06F 9/30* (2018.01)
*G06F 9/38* (2018.01)

(52) U.S. Cl.
CPC ........ *G06F 9/3838* (2013.01); *G06F 9/30021* (2013.01); *G06F 9/30036* (2013.01); *G06F 9/30043* (2013.01)

(58) Field of Classification Search
None
See application file for complete search history.

(56) References Cited

U.S. PATENT DOCUMENTS

| | | | |
|---|---|---|---|
| 5,781,752 A | 7/1998 | Moshovos et al. | |
| 6,694,424 B1 * | 2/2004 | Keller | G06F 9/3834 712/216 |
| 8,285,947 B2 | 10/2012 | Beaumont-Smith et al. | |
| 9,069,563 B2 | 6/2015 | Konigsburg et al. | |
| 9,430,235 B2 * | 8/2016 | Alexander | G06F 9/383 |
| 9,524,165 B1 | 12/2016 | Hutton et al. | |
| 9,760,379 B2 | 9/2017 | Hutton et al. | |
| 2010/0205384 A1 * | 8/2010 | Beaumont-Smith | G06F 9/3017 711/154 |

OTHER PUBLICATIONS

"Method for store-load forwarding in a single stage with store prevalidation", An IP.com Prior Art Database Technical Disclosure, Authors et. al.: Disclosed Anonymously, IP.com No. IPCOM000033800D, IP.com Electronic Publication Date: Dec. 28, 2004, 4 pages.
IBM, "Method of avoiding memory ambiguity flushes in a microprocessor using a memory dependency table", An IP.com Prior Art Database Technical Disclosure, Original Publication Date: May 4, 2009, IP.com No. IPCOM000182613D, IP.com Electronic Publication Date: May 4, 2009, 3 pages.

(Continued)

*Primary Examiner* — Corey S Faherty
(74) *Attorney, Agent, or Firm* — David K. Mattheis; William H. Hartwell; Nicholas L. Cadmus

(57) ABSTRACT

Managing program instruction execution by receiving a first OSC (operand store compare) instruction, the first OSC instruction comprising a first itag and a first instruction address and creating a first OSC table entry according to the first itag and first instruction address. Further, receiving a second OSC instruction, the second OSC instruction comprising a second itag and a second instruction address and creating a second OSC table entry according to the second itag and an itag delta between the first itag and the second itag, then appending the second OSC table entry according to an itag delta between the second itag and a third itag, and providing an itag delta from the second OSC table entry to an instruction sequencing unit (ISU).

20 Claims, 4 Drawing Sheets

(56) References Cited

OTHER PUBLICATIONS

IBM, "POWER8 Processor User's Manual for the Single-Chip Module", Mar. 16, 2016, Version 1.3, 452 pages.
Mell et al., "The NIST Definition of Cloud Computing", Recommendations of the National Institute of Standards and Technology, Special Publication 800-145, Sep. 2011, 7 pages.
Moshovos et al., "Dynamic Speculation and Synchronization of Data Dependences", Appears in the Proceedings of the 24th Annual International Symposium on Computer Architecture, 13 pages, Copyright © 1997 by the Association for Computing Machinery, Inc.
Moshovos et al., "Streamlining Inter-operation Memory Communication via Data Dependence Prediction", Published in the Proceedings of Micro-30, Dec. 1-3, 1997 in Research Triangle Park, North Carolina, 11 pages, Copyright 1997 IEEE.
Moshovos, Andreas Ioannis, "Memory Dependence Prediction", A dissertation submitted in partial fulfillment of the equirements for the degree of Doctor of Philosophy (Computer Sciences), University of Wisconsin—Madison, 1998, 176 pages.

\* cited by examiner

RESOLVING OPERAND STORE COMPARE CONFLICTS

BACKGROUND

The disclosure relates generally to managing system memory operations. The disclosure relates particularly to managing load and store command conflicts.

Computer programs provide a listing of instructions, or commands, in sequential order from start to finish. At the time of execution of the program, the commands may be executed in the sequence they are written, or the commands may be executed out-of-order to realize efficiencies in program execution. The efficiencies arise by reducing the processor cycles per instruction (CPI) required by executing the commands out of the written order.

Branching instructions illustrate an out-of-order opportunity. After reaching a branching instruction decision point, several processor clock cycles may be needed to resolve the decision and determine the correct path forward from the decision point. During those clock cycles, the program may execute instructions along each possible path forward from the decision point.

SUMMARY

Aspects of the invention disclose methods, systems and computer readable media associated with managing the execution of microprocessor load and store commands. In one aspect, managing application execution by receiving a first OSC (operand store compare) instruction, the first OSC instruction comprising a first instruction tag (itag) and a first instruction address and creating a first OSC table entry according to the first itag and first instruction address. Further, receiving a second OSC instruction, the second OSC instruction comprising a second itag and a second instruction address and creating a second OSC table entry according to the second itag and an itag delta between the first itag and the second itag, then appending the second OSC table entry according to an itag delta between the second itag and a third itag, and providing an itag delta from the second OSC table entry to an ISU (instruction sequencing unit).

DETAILED DESCRIPTION

Figure 1:
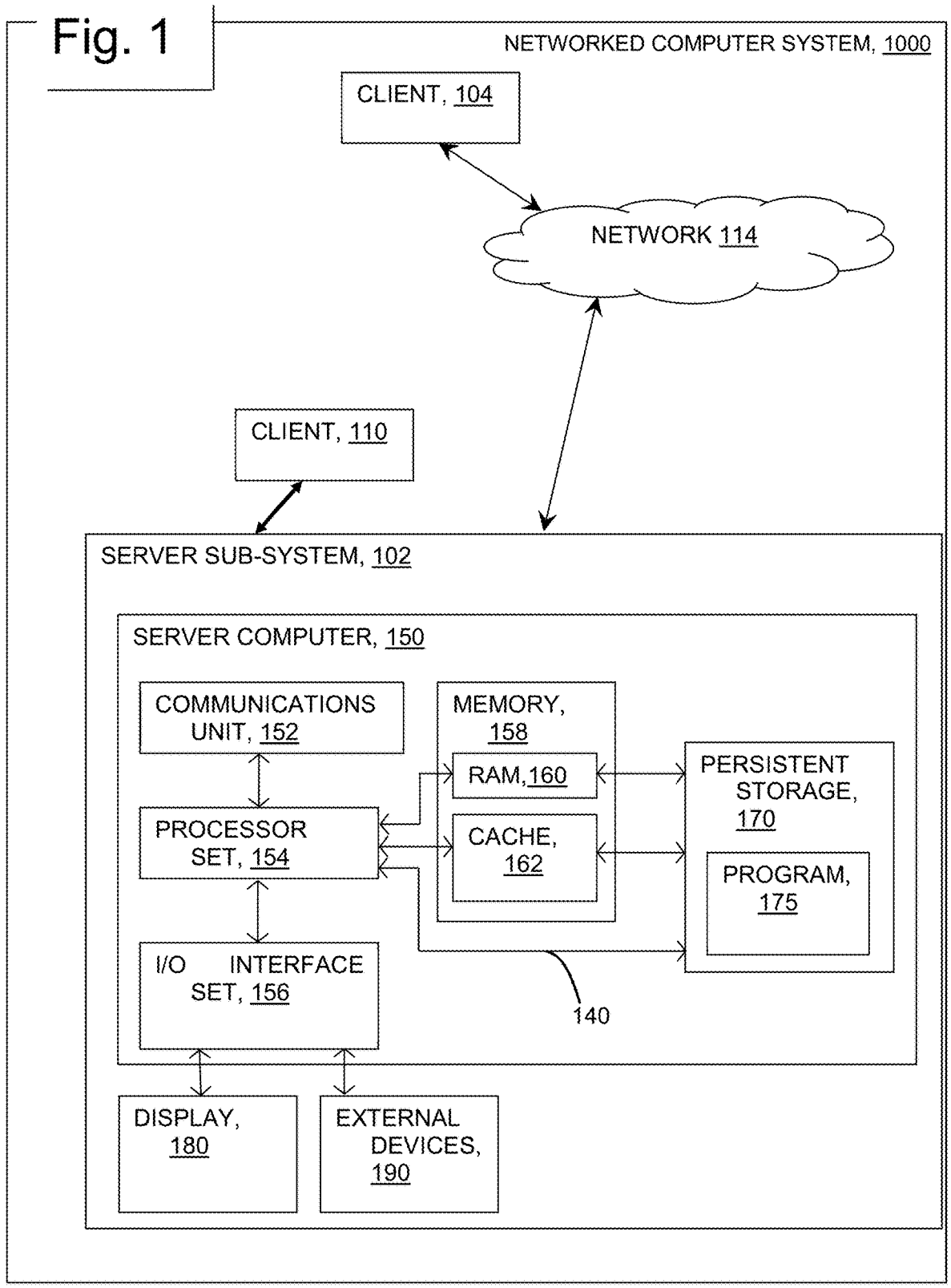
FIG. 1 provides a schematic illustration of a system, according to an embodiment of the invention.

Out-of-order execution may reduce processor cycles per instruction (CPI) required to execute the entire set of program commands but is not risk free. Operand store compare (OSC) conflicts arising from out-of-order execution can lead to wasted processor cycles and contribute to higher CPI numbers. OSC is defined as a conflict between an instruction with an operand to store data to memory and an instruction to load the data from the memory. Such conflicts may require the re-execution of the instructions, increasing the CPI of the instructions.

A load-hit-store (LHS) OSC conflict occurs when a load instruction is issued after a store instruction but before execution of the store instruction has begun. This OSC LHS conflict is detected on the load instruction causing it to be rejected and reissued, wasting processor cycles. Depending upon the distance in execution between the load and the store, as well as the duration required to complete the store, the reissued load instruction may also have an LHS OSC conflict resulting in a second rejection and reissuance of the instruction.

A store-hit-load (SHL) conflict occurs when the load instruction is issued before the store instruction. This OSC SHL conflict is detected on the store instruction, after the load instruction has executed. Detecting the conflict after the load has executed may result in the need to flush the load result and any subsequent results from commands issued subsequent to the load command. Flushing the command and results may require re-fetching the commands from memory before they can be decoded and reissued resulting in a large SHL related CPI penalty.

Absent an intervening mechanism, the OSC conflicts may reoccur each time the rejected or flushed instructions are reissued, as the underlying execution conflict has not been resolved. The OSC conflicts may also occur each time the relevant portion of the instruction set is executed due to the load-store instruction sequencing in the underlying program. Predictable OSC conflict issues can be reduced by forbidding the out-of-order execution of all load store combinations but that would have a negative impact on system performance. OSC conflicts may also be reduced by delaying the execution of load instructions having an OSC conflict until the execution of the associated store instruction.

Data tables associated with load and store commands have been used to delay the execution of load commands. Load-Hit-Store (LHS) tables have included the instruction tag of store commands as well as the command parameters associated with the store command. Instruction tags (itags) are assigned to instructions each time they pass through the execution pipeline of the computer. The itags are sequential, proceeding from smaller to larger itag values. The itags indicate the sequential order of instruction execution. The store command itag typically precedes the load command itag. The itag delta is typically the load itag minus the store itag.

The load tag values allow subsequent executions to be matched to previous OSC load-store conflicts in Store-Hit-Load (SHL) table entries. The itag delta provides an indication of the relative locations of the store and load instructions in the instruction sequence. The itag delta indicates how many instructions follow the store instruction before the load instruction. SHL tables have included an index associated with the load command effective address (EA), a load tag value calculated from the load EA for load commands recognized as having an OSC conflict, and a calculated difference between the itags of conflicting load and store command (an itag delta).

As a load command is processed, the load tag for the command is calculated from the load instruction EA. The calculated load tag can then be matched to SHL table entries having the same load tag. When a load command has a load tag matching an entry in the SHL table, the itag delta value of the SHL table entry is used to determine a store itag of a conflicting instruction. The LHS table is then searched for a store instruction having the itag value. When a store instruction having the itag indicated by the SHL itag delta is found in the LHS, information associated with the store command is passed from the LHS table entry to the system instruction sequencing unit (ISU) and a dependency is created between the store and load instructions allowing proper delay of the issuance of the load instruction relative to the store instruction.

A single load instruction may depend upon multiple store instructions. For example, load1 can depend upon store1, store2, store3, store2, store2, store 3. As instructions are issued and executed, the dependency distance can change, rendering a static table, listing dependency distances, ineffective. Store-Hit-Load table entries are also typically replaced during an SHL flush, offering no mechanism for tracking the multiple dependencies.

In an embodiment, OSC conflicts can be reduced using a combination of Store Hit Load (SHL) and Load Hit Store (LHS) tables. For a load instruction dependent upon multiple store instructions, as the first OSC load related conflict is detected, with no corresponding SHL entry, an in-order distance between the load instruction and the missing store instruction is noted and entered into an SHL table entry. The entry includes an instruction tag (itag) delta between the load and store instructions. For multiple conflicts due to the multiple stores, a series of itag deltas between the load instruction and each conflicting store instruction, are appended to the SHL table entry for the load instruction.

In this embodiment, when a load instruction has a hit in the SHL, all itag deltas associated with the hit entry are sent to the LHS for review. The youngest store instruction (that store instruction occurring latest in the order of execution) is then used to create the dependency between the load and store instructions by the instruction sequencing unit (ISU). Creating the dependency according to the youngest store instruction provides the longest delay in executing the load instruction providing the longest amount of time for all related store instructions to complete.

In an embodiment, as the execution of the program proceeds and load instructions are considered for OSC conflicts by checking against the SHL table entries, the execution of branching instructions can alter the itag delta values between load and store instructions having OSC conflicts. As branches are taken or not taken, the distance between a store and load can fluctuate and must be accounted for in the SHL, LHS table entries.

In this embodiment, as additional SHL conflicts are detected for a load command, and itag deltas are added to the SHL load entry, a hash of Global History Vector (GHV) data, indicating the then current state of the branching history of the program execution, may also be added in association with each itag delta entry.

In an embodiment, a GHV comprises a vector used to store the branching history of multiple conditional branches. Each dimension of the vector can be associated with a different group of instructions, with the position in the vector representing how recently the group of instructions were fetched. The GHV can be used to provide a current state of the program branching at any point during execution. In an embodiment, the full GHV is associated with the load instruction entry in the SHL table. Hashing the GHV makes comparing GHVs associated with particular load instruction execution points easier and requires fewer resources to store. Such comparisons can provide an indication that the relative state of branching at each of the load executions is the same.

Upon matching a current load command to an SHL entry having multiple itag deltas and associated hashed GHV values, the GHV of the program state associated with the current load command can be determined, the corresponding GHV hash value calculated and compared to the GHV hash values held in the SHL table entry. After a match is identified, the appropriate itag delta associated with that GHV value from the SHL entry may be cross-checked with entries of the LHS table to determine if a store command is present at the indicated location. The relevant itag delta is passed to the ISU to create the correct load-store dependency when a store command is found at the correct location in the LHS table.

As an example, the GHV associated with an SHL flush has a value of 0111010101, after the flush, an SHL entry is appended with the itag value and, for the example, the last four bits of the GHV, 0101. Upon a subsequent load hit in the SHL table, the GHV and hash for the SHL entry are matched with the hashed GHV value of the program state associated with the current load command. Upon a match of hashed GHV values, the LHS table is checked for a store command corresponding to the matching itag delta. If the store command is present at the indicated location, the corresponding itag is sent to the ISU for use establishing the load-store dependency and the load instruction is delayed according to the dependency.

In an embodiment where single load instructions are dependent upon multiple store instructions, the store instructions itag delta values can follow a repeating pattern: 3, 3, 10, 10, 3, 3, 10, 10. In this embodiment, a local history vector (LHV) may be used to store the itag delta pattern. Program execution may then be tracked in terms of progression through the local history vector itag delta pattern. When a current load command matches an SHL table entry, the current LHV progression can be checked and the appropriate itag may be provided to the ISU for creating the load-store dependency according to the current phase of execution relative to the LHV. In this embodiment, SHL table entries include an index and load tag together with one or more itag delta and LHV value pairs. In this embodiment, the index identifies individual SHL table entries. The index can comprise a portion of the bits of the load EA. The load tag is used to match subsequent load commands. The load tag can comprise a set of bits of the load EA. In an embodiment, the set of bits of the load tag comprising the index are distinct from the set of load EA bits comprising the load tag. The LHV values may be hashed to conserve space and resources. After a load tag is matched to an SHL entry, the LHV value of the current load tag is determined and matched to LHV values in the SHL table. The next itag delta in the LHV pattern from the SHL entry is used to check for a store command in the LHS table. If the store command is found in the LHS, the itag delta is passed to the ISU to create the load-store dependency and delay execution of the load command.

In an embodiment, the SHL and LHS table entries may be fully associated using the entire EA values rather than index and tag values to differentiate between EA values. In an embodiment, the table values may be stored in a 2-way, set associative cache, using an index and tag derived from the load EA, to differentiate values.

FIG. 1 provides a schematic illustration of exemplary network resources associated with practicing the disclosed inventions. The inventions may be practiced in the processors of any of the disclosed elements which process an instruction stream. As shown in the figure, a networked Client device 110 connects wirelessly to server sub-system 102. Client device 104 connects wirelessly to server sub-system 102 via network 114. Client devices 104 and 110 comprise software program (not shown) together with sufficient computing resource (processor, memory, network communications hardware) to execute the program. As shown in FIG. 1, server sub-system 102 comprises a server computer 150. FIG. 1 depicts a block diagram of components of server computer 150 within a networked computer system 1000, in accordance with an embodiment of the present invention. It should be appreciated that FIG. 1 provides only an illustration of one implementation and does not imply any limitations regarding the environments in which different embodiments can be implemented. Many modifications to the depicted environment can be made.

Server computer 150 can include processor(s) 154, cache 162, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory 160 (RAM). In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., application program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., application program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
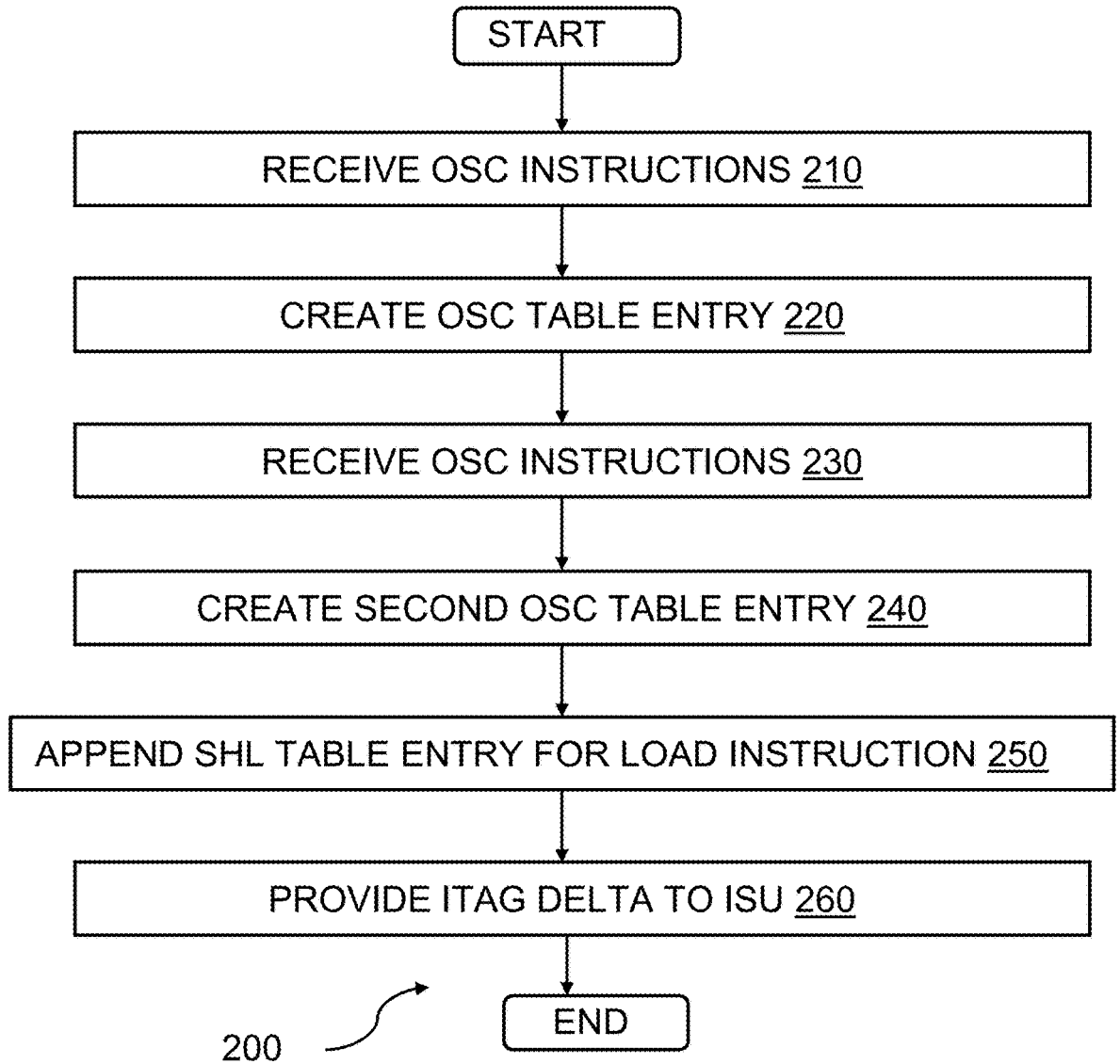
FIG. 2 provides a flowchart depicting an operational sequence, according to an embodiment of the invention.

FIG. 2 provides a flowchart 200, illustrating exemplary activities associated with the practice of the disclosure. After program start, a system receives an OSC instruction at 210. The OSC instruction may comprise a load instruction or a store instruction. The OSC instruction comprises an itag and an address. At 220, the system creates an OSC table entry according to the OSC instruction. The OSC table entry may be an SHL table—for load instructions, or an LHS table entry—for store instructions. The system receives a second OSC instruction at 230. The second OSC instruction may comprise a load instruction or a store instruction. The second OSC instruction comprises an itag and an address. At 240, the system creates a second OSC table entry according to the second OSC instruction. The second OSC table entry may be an SHL table—for load instructions, or an LHS table entry—for store instructions. At 250, the system appends the OSC SHL table entry for a load instruction depending upon multiple store instructions to include itag delta values associated with additional store instruction dependencies. At 260, the system provides an itag delta associated with a load-store conflict to an ISU (instruction sequencing unit) to create a dependency between load and store instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
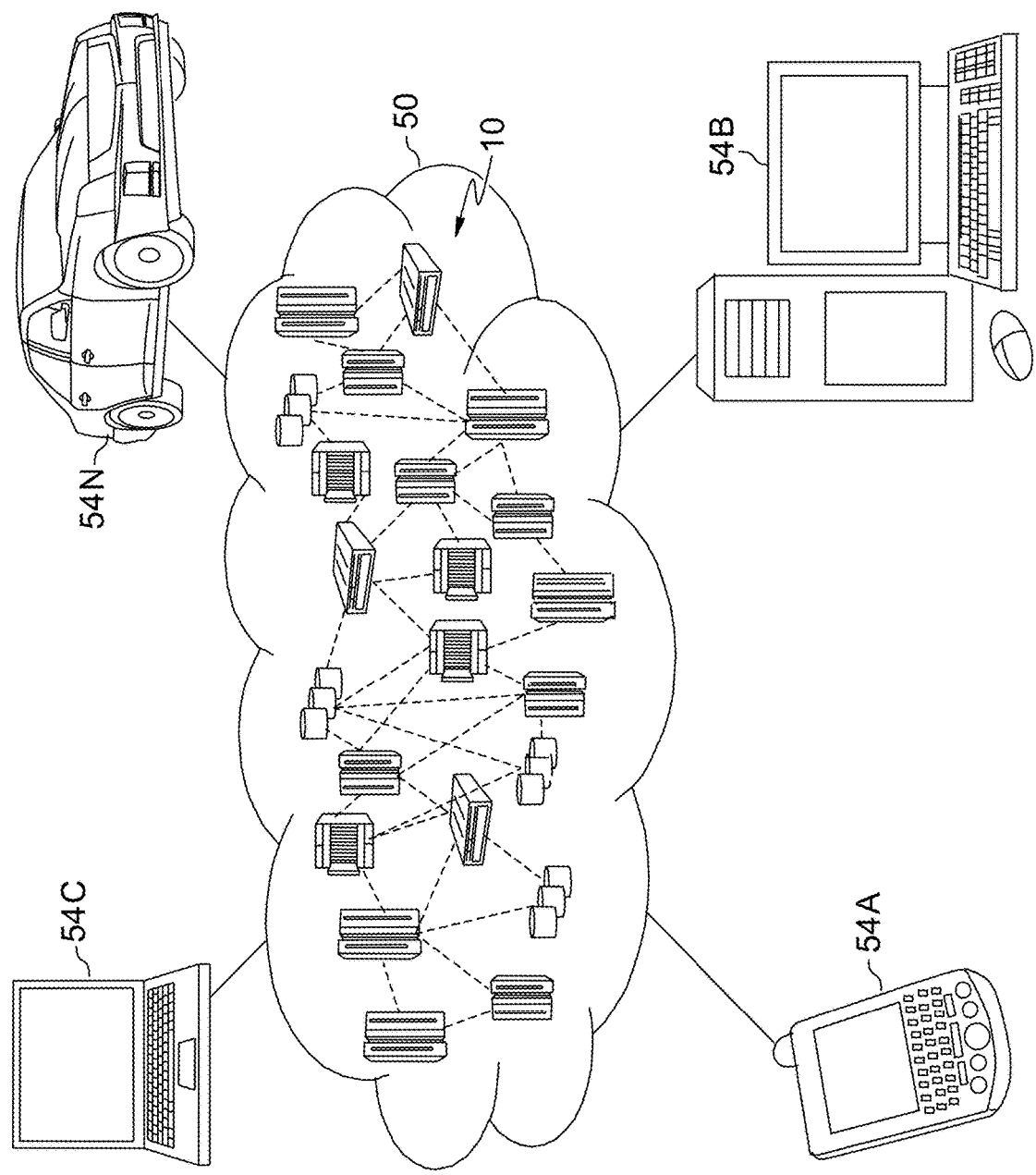
FIG. 3 depicts a cloud computing environment, according to an embodiment of the invention.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
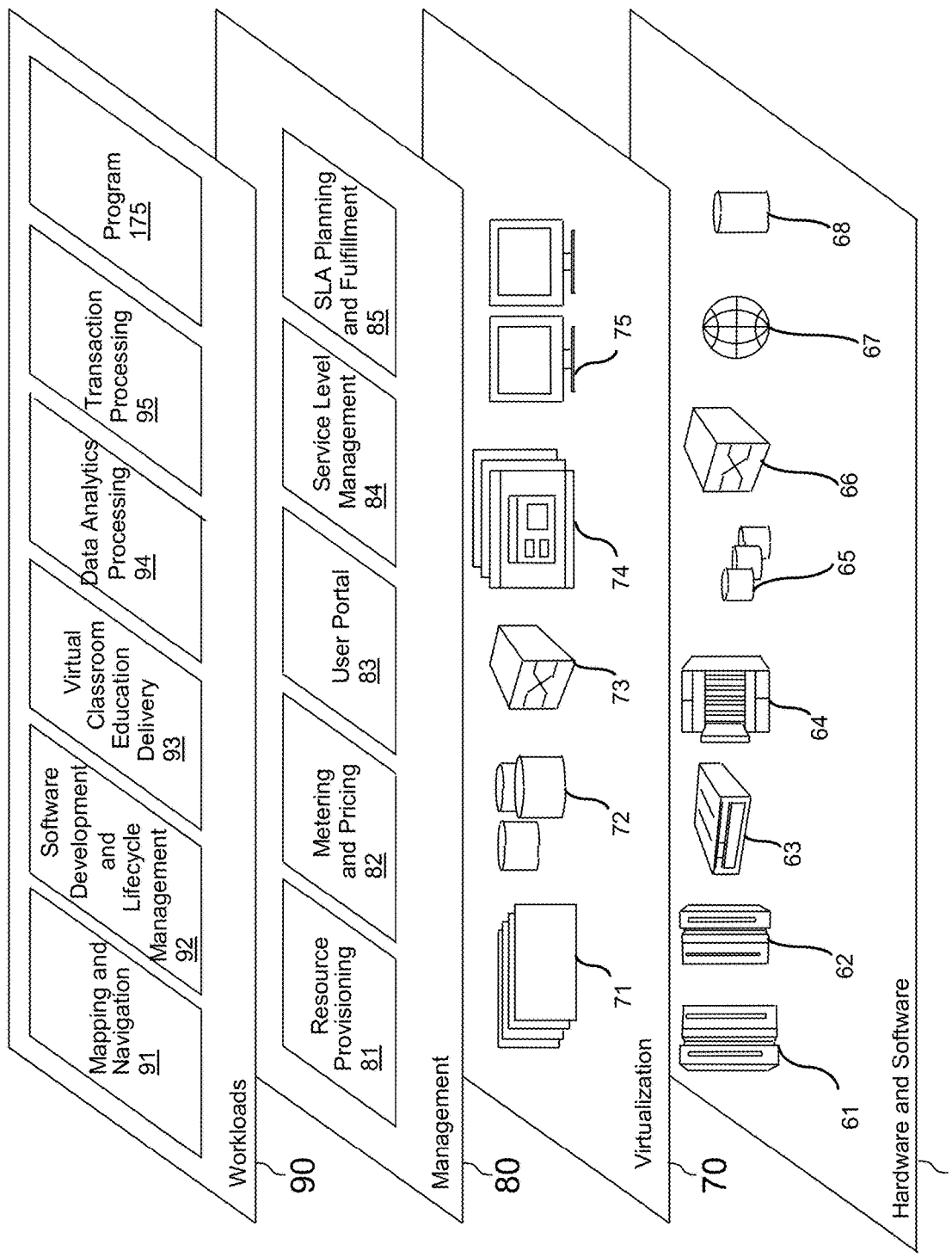
FIG. 4 depicts abstraction model layers, according to an embodiment of the invention.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for managing application execution, the method comprising:
   receiving a first OSC (operand store compare) instruction, the first OSC instruction comprising a first instruction tag (itag) and a first instruction address;
   creating a first OSC table entry according to the first itag and first instruction address;
receiving a second OSC instruction, the second OSC instruction comprising a second itag and a second instruction address;
   creating a second OSC table entry according to the second itag and an itag delta between the first itag and the second itag;
   appending the second OSC table entry according to an itag delta between the second itag and a third itag; and
   providing an itag delta from the second OSC table entry to an ISU (instruction sequencing unit).

2. The computer implemented method according to claim 1, further comprising creating a dependency between the first OSC instruction and the second OSC instruction according to an itag delta.

3. The computer implemented method according to claim 1, wherein providing an itag delta from the second OSC table entry to an ISU comprises providing a youngest itag delta from the second OSC table entry to the ISU.

4. The computer implemented method according to claim 1, further comprising:
   appending a hash value of a GHV (global history vector) associated with an itag delta value to the second OSC table entry; and
   providing an itag delta to the ISU according to the hash value of the GHV.

5. The computer implemented method according to claim 4, further comprising:
   determining a hash value of a GHV associated with the first OSC table entry;
   matching the hash value of the GHV associated with the first OSC table entry and the hash value of the GHV associated with an itag delta value of the second OSC table entry; and
   providing the itag delta value of the second OSC table entry associated with the hash value of the GHV of the second OSC table entry to the ISU.

6. The computer implemented method according to claim 1, further comprising:
   appending an LHV (local history vector) to the second OSC table entry, wherein the LHV comprises a set of itag delta values; and
   providing an itag delta to the ISU according to the LHV.

7. The computer implemented method according to claim 1, wherein the first OSC instruction comprises a store instruction and the second OSC instruction comprises a load instruction.

8. A computer program product for managing application execution, the computer program product comprising one or more computer readable storage devices and stored program instructions on the one or more computer readable storage devices, the stored program instructions comprising:
   programmed instructions for receiving a first OSC (operand store compare) instruction, the first OSC instruction comprising a first itag and a first instruction address;
   programmed instructions for creating a first OSC table entry according to the first itag and first instruction address;
   programmed instructions for receiving a second OSC instruction, the second OSC instruction comprising a second itag and a second instruction address;
   programmed instructions for creating a second OSC table entry according to the second itag and an itag delta between the first itag and the second itag;
   programmed instructions for appending the second OSC table entry according to an itag delta between the second itag and a third itag; and
   programmed instructions for providing an itag delta from the second OSC table entry to an ISU (instruction sequencing unit).

9. The computer program product according to claim 8, the stored program instructions further comprising:
   programmed instructions for creating a dependency between the first OSC instruction and the second OSC instruction according to an itag delta.

10. The computer program product according to claim 8, wherein providing an itag delta from the second OSC table entry to an ISU comprises providing a youngest itag delta from the second OSC table entry to the ISU.

11. The computer program product according to claim 8, the stored program instructions further comprising:
   programmed instructions for appending a hash value of a GHV (global history vector) associated with an itag delta value to the second OSC table entry; and
   programmed instructions for providing an itag delta to the ISU according to the hash value of the GHV.

12. The computer program product according to claim 11, the stored program instructions further comprising:
   programmed instructions for determining a hash value of a GHV associated with the first OSC table entry;
   programmed instructions for matching the hash value of the GHV associated with the first OSC table entry and the hash value of the GHV associated with an itag delta value of the second OSC table entry; and
   programmed instructions for providing the itag delta value of the second OSC table entry associated with the hash value of the GHV of the second OSC table entry to the ISU.

13. The computer program product according to claim 8, the stored program instructions further comprising:
   programmed instructions for appending an LHV (local history vector) to the second OSC table entry, wherein the LHV comprises a set of itag delta values; and
   programmed instructions for providing an itag delta to the ISU according to the LHV.

14. The computer program product according to claim 8, wherein the first OSC instruction comprises a store instruction and the second OSC instruction comprises a load instruction.

15. A computer system for managing application execution, the computer system comprising:
- one or more computer processors;
- one or more computer readable storage devices;
- stored program instructions on the one or more computer readable storage devices for execution by the at least one or more computer processors, the stored program instructions comprising:
  - programmed instructions for receiving a first OSC (operand store compare) instruction, the first OSC instruction comprising a first itag and a first instruction address;
  - programmed instructions for creating a first OSC table entry according to the first itag and first instruction address;
  - programmed instructions for receiving a second OSC instruction, the second OSC instruction comprising a second itag and a second instruction address;
  - programmed instructions for creating a second OSC table entry according to the second itag and an itag delta between the first itag and the second itag;
  - programmed instructions for appending the second OSC table entry according to an itag delta between the second itag and a third itag; and
  - programmed instructions for providing an itag delta from the second OSC table entry to an ISU (instruction sequencing unit).

16. The computer system according to claim 15, the stored program instructions further comprising:
- programmed instructions for creating a dependency between the first OSC instruction and the second OSC instruction according to an itag delta.

17. The computer system according to claim 15, wherein providing an itag delta from the second OSC table entry to an ISU comprises providing a youngest itag delta from the second OSC table entry to the ISU.

18. The computer system according to claim 15, the stored program instructions further comprising:
- programmed instructions for appending a hash value of a GHV (global history vector) associated with an itag delta value to the second OSC table entry; and
- programmed instructions for providing an itag delta to the ISU according to the hash value of the GHV.

19. The computer system according to claim 18, the stored program instructions further comprising:
- programmed instructions for determining a hash value of a GHV associated with the first OSC table entry;
- programmed instructions for matching the hash value of the GHV associated with the first OSC table entry and the hash value of the GHV associated with an itag delta value of the second OSC table entry; and
- programmed instructions for providing the itag delta value of the second OSC table entry associated with the hash value of the GHV of the second OSC table entry to the ISU.

20. The computer system according to claim 15, the stored program instructions further comprising:
- programmed instructions for appending an LHV (local history vector) to the second OSC table entry, wherein the LHV comprises a set of itag delta values; and
- programmed instructions for providing an itag delta to the ISU according to the LHV.

* * * * *